United States Patent [19]

Taniyama

[11] Patent Number: 5,425,629

[45] Date of Patent: Jun. 20, 1995

[54] APPARATUS FOR MOLDING MINI-COMPACT DISK CARTRIDGE SHELLS

[76] Inventor: Yoshihiko Taniyama, 9380 Old Southwick Pass, Alpharetta, Ga. 30202

[21] Appl. No.: 114,218

[22] Filed: Aug. 30, 1993

[51] Int. Cl.$^6$ .................. B29C 45/26; B29C 45/27
[52] U.S. Cl. .................. 425/549; 425/564; 425/DIG. 224; 425/DIG. 228; 264/328.12
[58] Field of Search ............. 425/549, 573, 564, 565, 425/566, DIG. 224, DIG. 228; 264/328.12

[56] References Cited

U.S. PATENT DOCUMENTS

| | | | |
|---|---|---|---|
| 4,445,155 | 4/1984 | Takahashi et al. | 360/99 |
| 4,445,157 | 4/1984 | Takahashi | 360/133 |
| 4,510,546 | 4/1985 | Asami et al. | 360/133 |
| 4,544,977 | 10/1985 | Ozawa et al. | 360/133 |
| 4,646,916 | 3/1987 | Ishida et al. | 206/387 |
| 4,698,013 | 10/1987 | Butcher | 425/549 |
| 4,787,840 | 11/1988 | Gellert | 425/549 |
| 5,084,862 | 1/1992 | Fujita et al. | 369/291 |
| 5,090,890 | 2/1992 | Morita | 425/564 |
| 5,106,291 | 4/1992 | Gellert | 425/549 |
| 5,161,081 | 11/1992 | Machida et al. | 360/133 |

*Primary Examiner*—Khanh Nguyen
*Attorney, Agent, or Firm*—Troutman Sanders; Joel S. Goldman; John A. Savio, III

[57] ABSTRACT

The invention relates to an apparatus for injection molding the shells of a mini-disk cartridge or the like. More particularly, the device includes a main cavity having a shape of mini-disk shell. The mold contains various projections and indentations on the first and second surfaces, respectively, which are adapted to form a shutter recess near a first edge of the lower shell, a read/write port for a media disk in a vicinity of the first edge within the shutter recess, a shutter guide track on the outer surface of the lower shell close to and parallel to the first edge, a drive port for rotating a media disk, and various fastening bosses for fastening the upper and lower shells of the mini-disk cartridge together. A single hot-runner valve gate is placed in the mold close to one corner such that small cavities within the cavity are filled with polymer melt first. This valve gate position assures that the mold is completely and rapidly filled to facilitate even heat transfer from the polymer melt so as to prevent warpage of the lower shell after removal from the molds.

8 Claims, 10 Drawing Sheets

5,425,629

APPARATUS FOR MOLDING MINI-COMPACT DISK CARTRIDGE SHELLS

BACKGROUND OF THE INVENTION

1. Field of the Invention

This invention relates generally to injection molding, and in particular, to the use of a single hot-runner valve gate to mold upper and lower shells for mini-compact disk (mini-disk) cartridges, and the like.

A mini-disk cartridge is used to store information and is comprised of several basic components. A media storage disk, commonly referred to as a mini-compact disk, is stored within a shell which protects the disk from harmful debris. The shell is typically comprised of a lower shell and an upper shell. When manufacturing the mini-disk cartridge, the disk is placed into the lower shell and the upper shell is then placed over the lower shell and disk. The lower and upper shells are fastened together using internal bosses. Read/write ports are incorporated into the lower and/or upper shells to allow a reading/writing device to access the mini-compact disk within the shell. A sliding shutter covers the read/write port when the mini-disk cartridge is not in use to protect the mini-compact disk from harmful debris.

2. Description of the Prior Art

As is illustrated in FIG. 1 of the prior art, two pairs of juxtaposed pinpoint gates 10, 20 and 30, 40 are needed to injection mold both the lower shell 50 and upper shell 60, respectively, of a mini-disk cartridge. This pinpoint gate arrangement assures that cavities within a mold associated with shutter recess 70, read/write port 90, shutter guide track 80, fastening bosses on inner surfaces (not shown), and other tight corners and small crevices are filled quickly and constantly, to insure that the cooling time for the plastic is the same throughout the mold. As long as the cooling time throughout the mold is the same, the possibility of warpage within the shell is significantly reduced.

There are several disadvantages associated with using two cold-runner pinpoint gates to injection mold shells of a mini-disk cartridge, or the like. One such disadvantage is the accumulation of polymer string at pinpoints 11, 21, 31, and 41. This string must be removed from the shell or further manufacturing problems may occur when other components of the mini-disk are placed within the shell. Furthermore, at least two pinpoint gates are necessary to mold each shell because the flow rate through a single a pinpoint gate is inadequate to fill up the cavity fast enough for a uniform cooling time. If only one cold-runner pinpoint gate is used, mold filling time increases, a polymer "skin" is formed from the melt which clogs the mold, shell walls of non-uniform thickness are formed, and small cavities in the mold associated with shutter recess 70, read/write port 90, shutter guide track 80, the fastening bosses, and other small cavities are prevented from filling, thus producing a defective product. Additionally, excessive warpage of the shells occurs due to uneven cooling of the plastic when only one cold-runner value gate is used.

Alternatively, two hot-runner valve gates have been utilized to decrease mold filling time for uniform cooling. However, it is difficult to balance the cooling temperature of the two valve gates, necessitating constant adjustments and tweaking during the manufacturing process, thus decreasing the overall time efficiency of the molding process.

SUMMARY OF THE INVENTION

While several cold-runner gates have been used to mold shells for mini-disks and the like, no such known design or process has been developed which would utilize a single hot-runner valve gate to substantially improve the molding process by increasing the flow rate of melt and thus reducing mold cycle time. In accordance with the present invention, a single hot-runner valve gate is strategically sized and positioned, thereby allowing the entire mold to be filled quickly, and also allowing the cooling time throughout the mold to remain fairly constant. The cycle time for a single hot-runner valve gate is reduced by approximately 40% as compared to two pinpoint cold-runner gates while the need for excessive adjustment associated with two hot-runner valve gates is eliminated. Moreover, the chance of warpage to the shell is reduced to a minimum, and the thickness of the shell's walls should become uniformly formed. Finally, the single hot-runner valve gate also prevents polymer string from accumulating at the gate.

More specifically, the injection molding apparatus according to the present invention includes a main cavity having a shape of a lower or an upper mini-disk shell. This main cavity contains various projections and indentations or cavities used to form, for example, a shutter recess in the vicinity of a first edge of the lower shell, a read/write port for a media disk within the shutter recess, a shutter guide track on the outer surface of the lower shell, a drive port for rotating a media disk, various fastening bosses for fastening the upper and lower shells of the mini-disk cartridge together, and other related structures which generally have a high resistance to polymer melt flow. Additionally, a single hot-runner valve gate is located near a corner of the main cavity such that cavities having a high resistance to polymer melt flow one filled first. This valve gate position assures that the mold is completely and rapidly filled to facilitate even cooling time from the polymer melt throughout the mold so as to prevent warpage of the lower shell after removal from the mold.

Accordingly, it is an object of the invention to quickly fill a mold with polymer melt so that even cooling may occur and a mini-disk shell may be formed without warping or impurities.

It is another object of the invention to strategically place a single hot-runner valve gate within a mini-disk shell mold, or the like, so that the polymer melt may fill tight corners and minute details before more open spaces are filled within the shell mold.

Still another object of the invention to use a single hot-runner valve gate to reduce cycle time and to eliminate waste associated with pinpoint runner gates.

Still another object of the invention is to use a single hot-runner valve gate for molding mini-disk cartridge shells, or the like to eliminate excessive adjustments associated with several hot-runner valve gates.

Still another object to the invention is to use a single hot-runner valve gate for molding mini-disk cartridge shells, or the like to achieve even cooling throughout the mold.

Finally, another object of the invention is to use a hot-runner valve within the mold to prevent polymer string from accumulating at the gate.

Other objects, features, and aspects of the present invention are discussed in greater detail below.

BRIEF DESCRIPTION OF THE DRAWINGS

The accompanying drawings illustrate the preferred embodiment of the invention, and serve to aid in the explanation of the principles of the invention.

DETAILED DESCRIPTION OF THE PREFERRED EMBODIMENT

Figure 1:
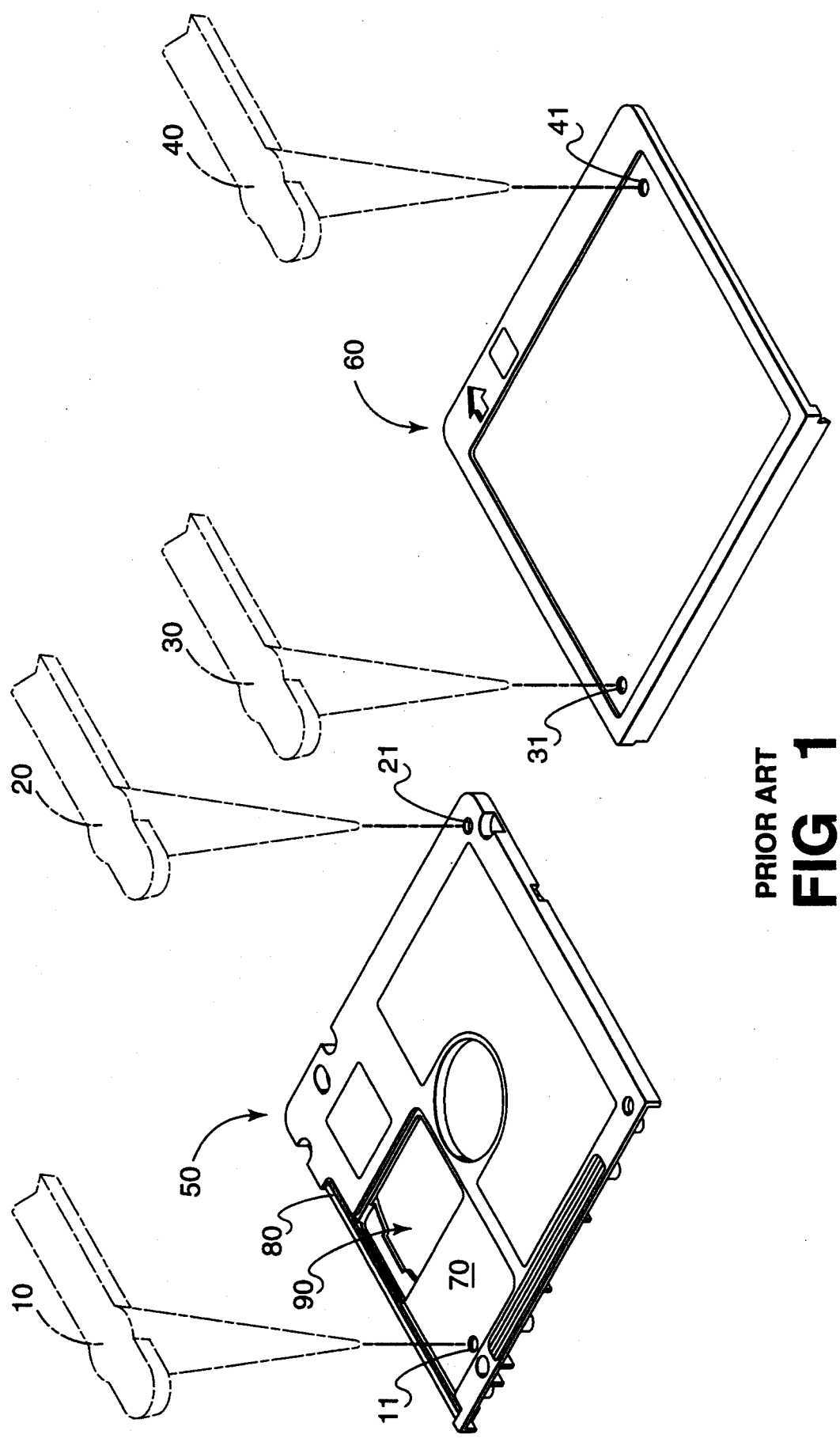
FIG. 1 illustrates a prior art cold-runner valve gate location with respect to lower and upper shells of a mini-disk cartridge.
Figure 2:
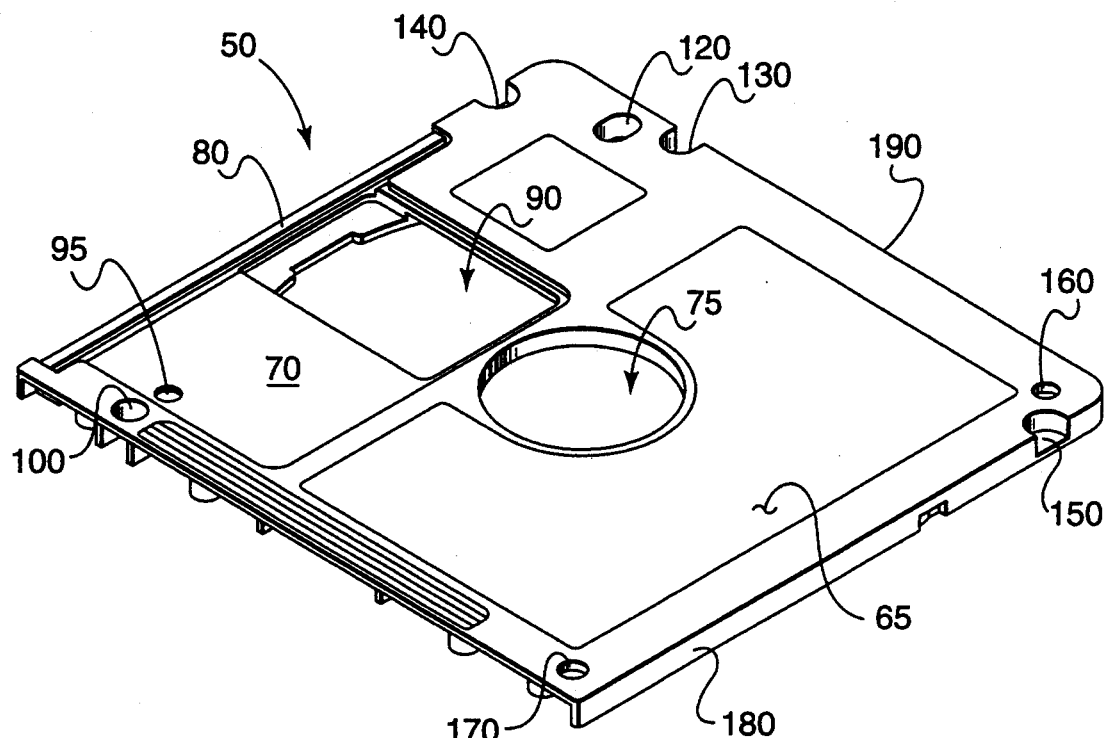
FIG. 2 illustrates an outside isometric view of a lower shell for a mini-disk cartridge molded according to the present invention.
Figure 3:
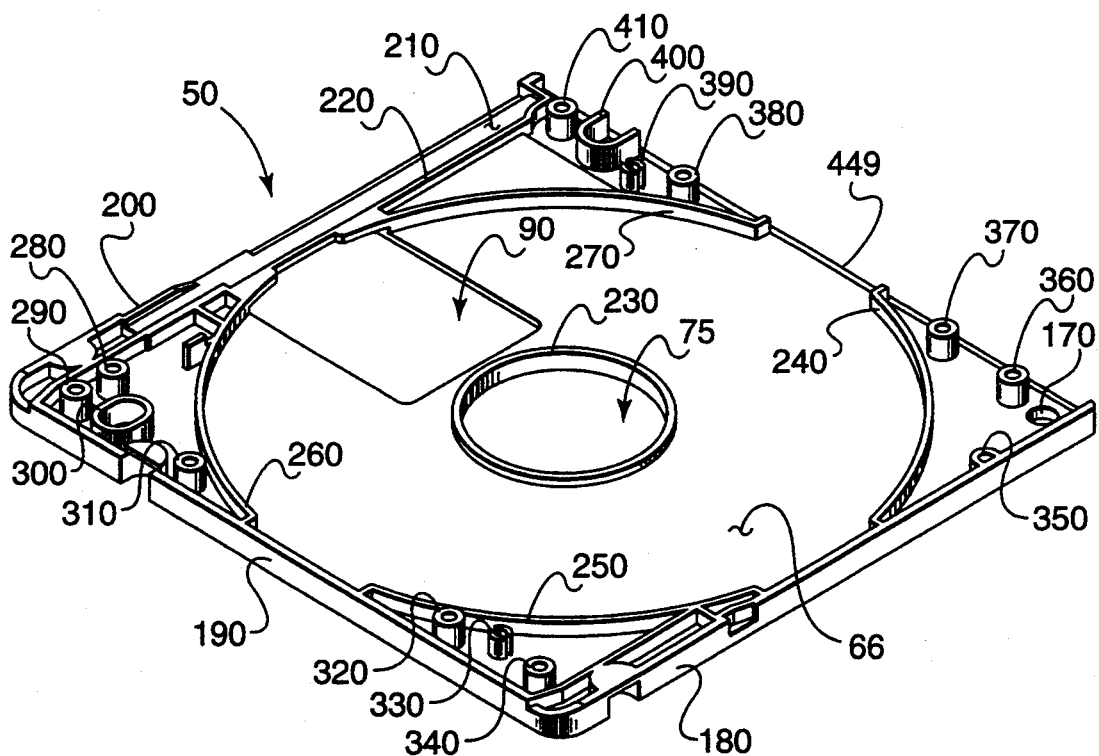
FIG. 3 illustrates an outside isometric view of a lower shell of a mini-disk cartridge molded according to the present invention.

FIGS. 2 and 3 illustrate each of the features that are incorporated into a lower shell 50 of the mini-disk cartridge. Sidewalls 180, 190, 200, and 220 extend from outer surface 65. Outer surface 65 has a recess 70 that is adapted to receive a shutter (not shown), which protects a media disk (not shown) within the mini-disk cartridge. A shutter guide 80 is adapted to receive an edge of the shutter (not shown) and allows the shutter to slide parallel to wall=200, exposing a read/write port 90 after the mini-disk cartridge has been inserted into an appropriate reading/writing device. Various apertures 100, 170 and 120 as well as notches 130, 140, and 150 are incorporated into outer surface 65. These apertures and notches are used for both positioning the mini-disk within the reading device (not shown) and for opening the shutter (not shown) via appropriate mechanical means. Drive port 75 is located on a center portion of surface 65 and is adapted to allow access for appropriate mechanical means to drive a media disk within the mini-disk cartridge. Also visible On outer surface 65 of lower shell 50 are gate marks 95 and 160. According to the present invention a single hot-runner valve gate is used to injection mold lower shell 50; therefore one gate is actually a dummy gate (i.e., a plug) and the other is used as a location for a single hot-runner valve gate.

FIG. 3 illustrates in detail various features on an inside surface 66 of lower shell 50. A plurality of bosses 270, 280, 290, 300, 310, 320, 330, 340, 350, 360, 370, 380, 390, 400 and 410 are incorporated onto inside surface 66. The aforementioned bosses are used for attaching lower shell 50 to upper shell 60 and for attaching internal mechanical components within the mini-disk shell. Bosses 300 and 400 also serve as walls for apertures 120 and 100, respectively, so that debris may not enter the shell therethrough and damage a media disk therein. Other noteworthy structures incorporated onto surface 66 include arcuate guide walls 240, 250, 260, and 270 are adapted which form a substantially circular guide for the media disk within shells 50. An annular support 230 is centered within the arcuate guide walls, which serves to support and center the media disk. Side walls 180, 190, 200 and 220 also extend from inside surface 66. The side walls are adapted to form a protective closure for the media disk when the shell halves are assembled. Wall 220 is slightly recessed from an outer edge of surface 166 leaving surface 210 exposed so that appropriate mechanical means within the reading device can retract the shutter (not shown) along shutter guide 80 within recess 70.

Figure 4:
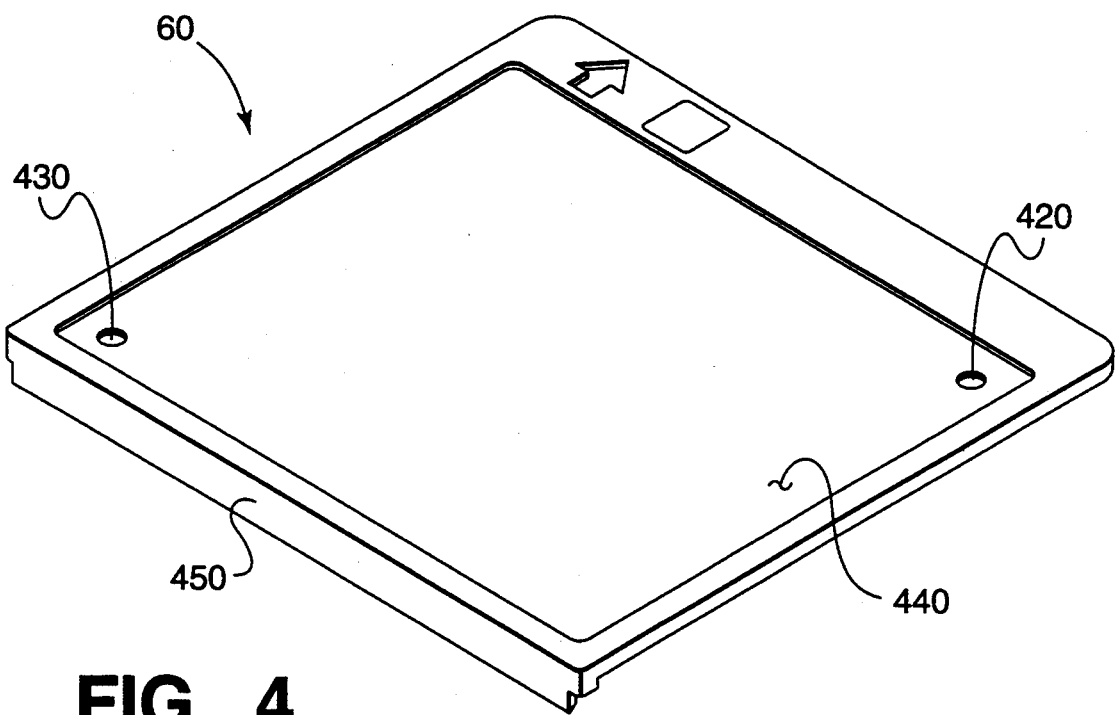
FIG. 4 illustrates an outside isometric of an upper shell of a mini-disk cartridge molded according to the present invention.
Figure 5:
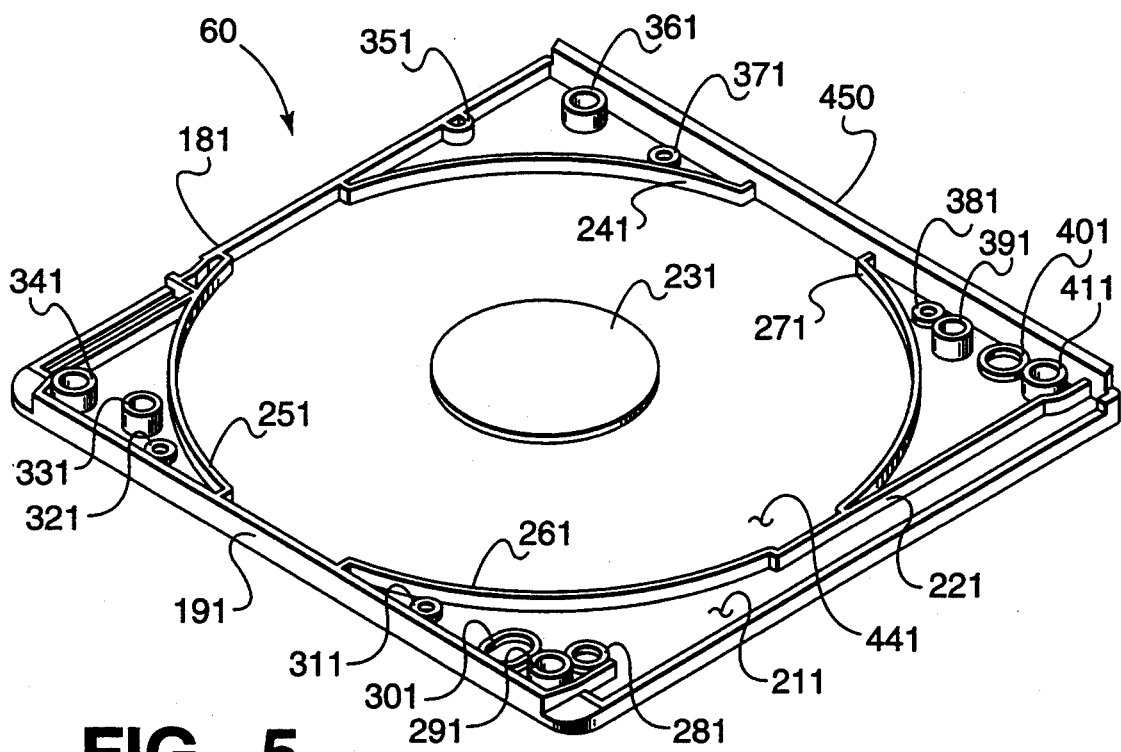
FIG. 5 illustrates an inside isometric view of an upper shell of a mini-disk cartridge molded according to the present invention.

FIGS. 4 and 5 illustrate inner and outer surfaces 441 and 440 of upper shell 60, respectively. In a manner similar to lower shell 50, upper shell 60 has gate indentations 420 and 430 incorporated within recessed portion of surface 440. Also, as in lower shell 50, only one hot-runner valve gate is used to injection mold upper shell 60; therefore one gate is a dummy gate (i.e. a plug) and the other is used as an actual location for a single hot-runner valve gate. Wall 450 is also incorporated into upper shell 60 and is adapted to meet beveled edge 449 of lower shell 50 as shown in FIG. 3, completing the outer wall structure for the mini-disk shell halves.

FIG. 5 illustrates inside surface 441 of upper shell 60 in detail. Incorporated into surface 441 is a plurality of bosses 281, 291, 301, 311, 321, 331, 341, 351, 361, 381, 391, 401, and 411. The bosses attach upper shell 60 to lower shell 50, and attach mechanical components to internal portions of the mini-disk shell. Other noteworthy structures incorporated onto inside surface 66 include arcuate guide walls 241, 251, 261, and 271 which are adapted to form a substantially circular guide for the media disk within shells 50 and 60. An annular support 231 is centered within the arcuate guide walls, which serves to support and center the media disk. Side walls 181, 191, 221 and 450 also extend from inside surface 441. The side walls are adapted to form a protective closure for the media disk when the shell halves are assembled. Wall 221 is slightly recessed from an outer edge of surface 441 leaving surface 211 exposed so that appropriate mechanical means within the reading device can retract the shutter (not shown).

Lower shell 50 matingly engages upper shell 60 to form a protective cartridge in the following manner. Boss 290 from lower shell 50 is adapted to fit within boss 291 of upper shell 60; similarly, 340 within 341, 410 within 411, 390 within 391, and 360 within 361. Also, boss 400 rests against boss 401, boss 380 against 381, 280 against 281, 300 against 301, and 310 against 311. Mating pairs of bosses can be fastened together by any known means. Usually, mating pairs of bosses are welded together ultrasonically after internal components are placed within the mini-disk shells. Arcuate guide walls 241, 251, 261, and 271 of upper shell 60 are adapted to meet with arcuate guide walls 240, 250, 260, and 270, respectively, of lower shell 60 to form a substantially circular chamber for the media disk after the shell halves are assembled. Similarly, sidewalls 181, 191, 221 and 450 of upper shell 60 are adapted to engage side walls 180, 190, 220 and edge 449, respectively, of lower shell 50. The arcuate guide walls and sidewalls may be fastened together by any known means.

The bosses formed onto the inner surfaces 66 and 441 correspond to a plurality of cavities and tight corners on mold surfaces that form the inner surfaces 66 and 441 of shells 50 and 60, respectively. These cavities and tight corners offer a higher resistance to polymer melt flow during injection than a volume defined by the space between surfaces 65 and 66 of the lower shell 50 and a space between surfaces 440 and 441 of upper shell 60. The structure Within the mold adapted to form shutter recess 70 on lower shell 50 also represents a portion of the mold having a higher resistance to polymer melt flow than the volume defined by the space between surfaces 65 and 66 of the lower shell 50 and the space between surfaces 440 and 441 of upper shell 60. Portions of the mold which offer a low resistance to polymer melt flow also include channels in the mold surface which correspond to sidewalls 180 and 190 of lower shell 50 and sidewalls 181, 191, and 451 of upper shell 60. Polymer melt flow throughout the mold is illustrated in greater detail in FIGS. 7-10.

The cavities of high polymer melt flow resistance must be filled nearly as quickly the areas of lower polymer melt flow resistance to promote even cooling time throughout the mold. A hot-runner valve gate allows the above-mentioned areas of higher polymer melt flow resistance to be filled more quickly due to the low viscosity of the high temperature melt. This offers a significant advantage over the use of cold-runner pinpoint gates for several reasons. Since a single cold-runner pinpoint gate does not contain heating elements, the melt has a higher viscosity at the gate. This leads to excessive resistance to the flow of melt and clogging of the mold. Furthermore, volumetric flow through a hot-runner valve gate is significantly greater than the flow rate through a pinpoint gate, thus decreasing the time required to fill the mold and promoting even cooling of the mold.

Figure 6:
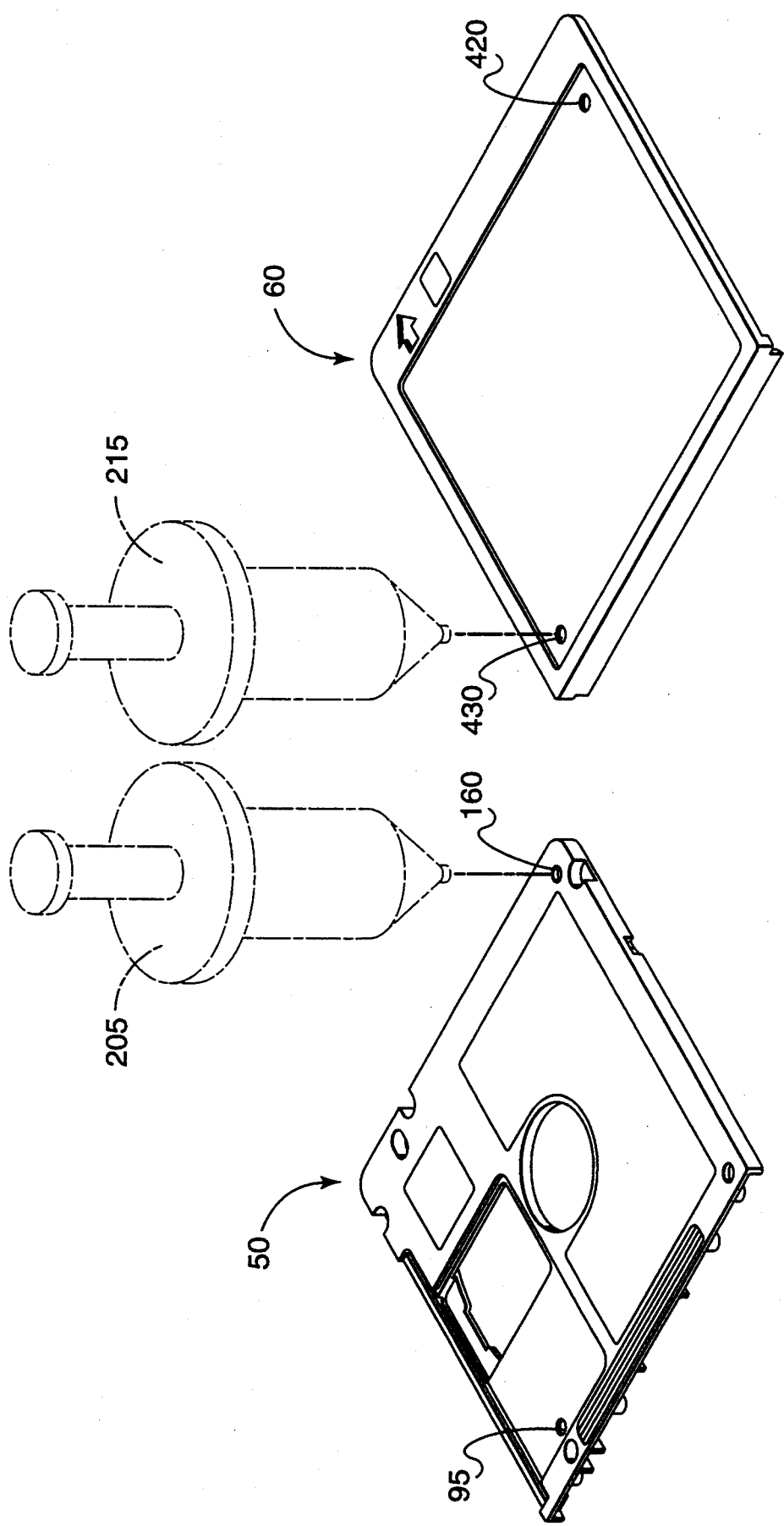
FIG. 6 illustrates a hot-runner valve gate location with respect to lower and upper shells of a mini-disk cartridge, as they are positioned in a mold (not shown), according to the present invention.

FIG. 6 illustrates a single hot-runner valve gate to mold for upper and lower shells. In a preferred embodiment, hot-runner valves 205 and 215 are inserted into the mold (not shown) at gate locations 160 and 430. Gate locations 95 and 420 are plugged. Alternatively, hot-runner valves 205 and 215 may be placed at gate locations 95 and 420, respectively, while gates 160 and 430 are plugged to mold the upper and lower shells. The valves 205 and 215 are located near the corners of the upper and lower shells for several reasons. As is shown in FIGS. 3 and 5, a plurality of bosses exist in each of corner on inside surfaces 66 and 441 of lower and lapper shells 50 and 60, respectively. Each boss represents a portion which provides a higher flow resistance due to the tortuous path which the polymer must follow. These portions must be filled relatively quickly to assure that cooling time throughout the mold remains relatively uniform to prevent excessive warpage. Other structures such as arcuate guide walls 240, 250, 260, and 270 represent other portions which must also be filled quickly so that they may have the same cooling time as the rest of the shell. Furthermore, shutter recess 70 also represents a portion within the mold which offers a greater resistance to flow due to its decreased cross sectional area. This portion must also be filled quickly before a polymer "skin" is formed during cooling which can clog the mold, thus producing a shell which may have voids in areas that offer a greater resistance to flow. One hot-runner valve gate per shell is used; therefore the viscosity of the polymer melt is lower than that of melt injected from a cold-runner pinpoint gate, thus allowing the polymer melt to flow more freely as compared to several cold-runner valve gates.

Figure 7A:
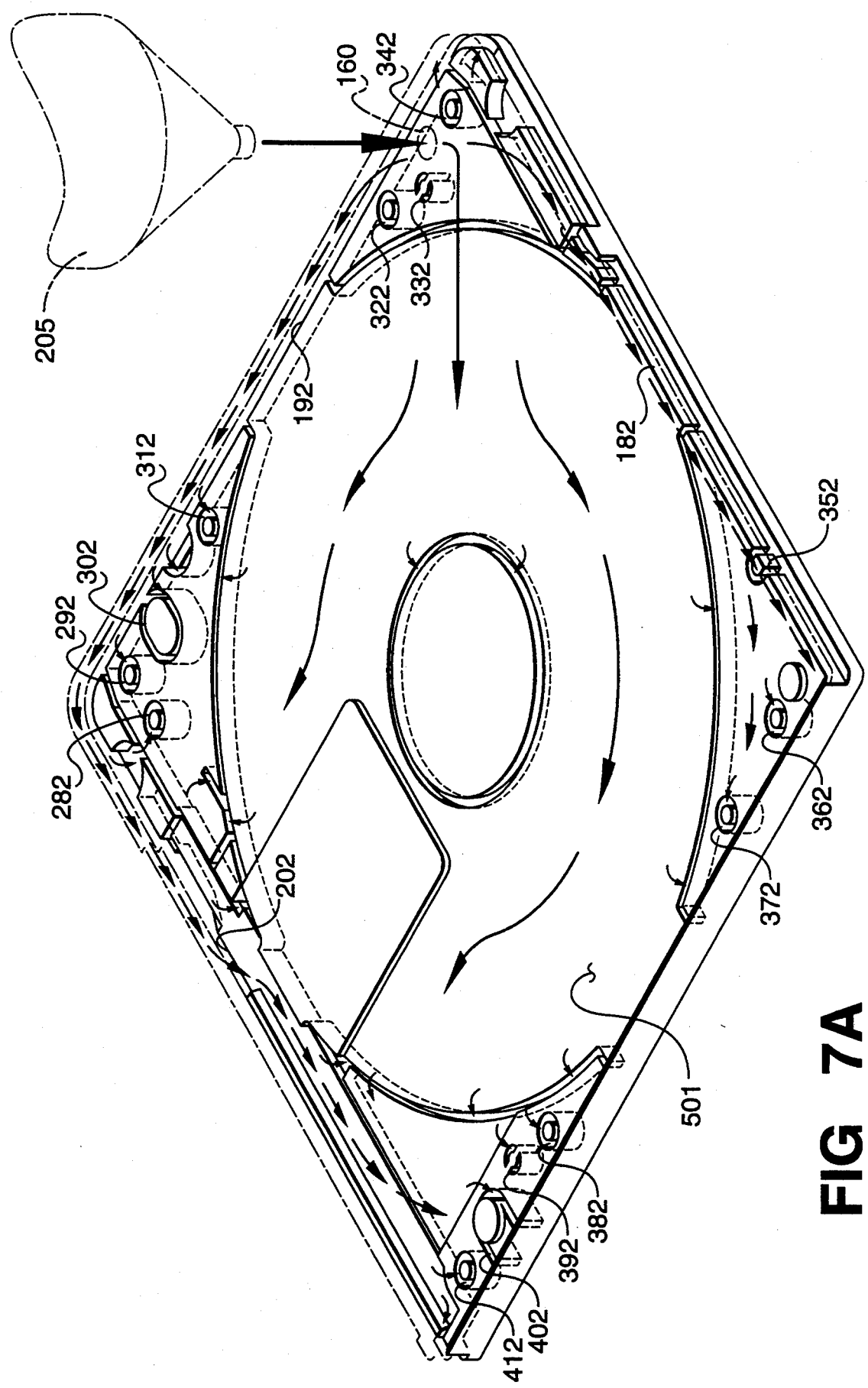
FIG. 7A illustrates a first position of a hot-runner valve gate and a first flow pattern of polymer melt with respect to a surface of the mold which forms an inner surface of a lower shell of a mini-disk cartridge.

Each shell structure within the mold contributes to the flow patterns within the mold. FIGS. 7a, 7b, 8a, and 8b illustrate the polymer melt flow pattern in the mold during injection when gate locations 160 and 430 are used. FIG. 7a illustrates a mold surface 501 which forms the inner surface 66 of the lower shell 50. Hot-runner valve 205 injects polymer melt into the mold. Arrows indicate the general direction of flow throughout the mold to various structures which include depressions and channels Which form bosses and sidewalls, respectively, for each shell. Depressions 322, 332, and 342 are first exposed to the melt. The melt flows along channel-like structures 182, 192, and 202 so that remote portions which offer a greater resistance to flow may be quickly filled. Thus, melt can fill depressions 282, 292, 302, and 312 as well as depressions 372, 362, and 352. Furthermore, depressions 382, 392, and 412 can also be filled quickly from melt flow over the center portion of the mold as well as along channel 202.

Figure 7B:
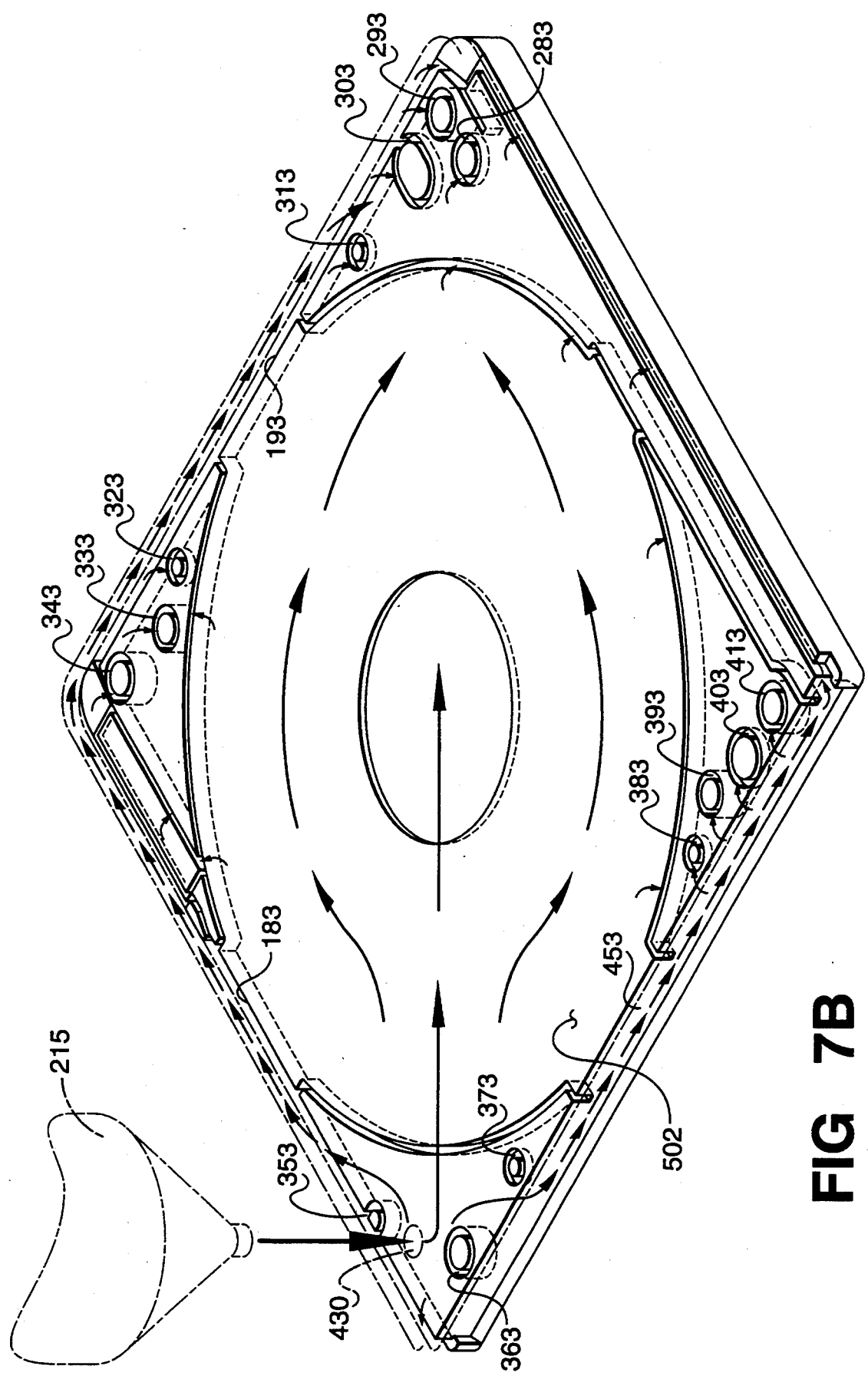
FIG. 7B illustrates a first position of a hot-runner valve gate and a first flow pattern of polymer melt with respect to a surface of the mold which forms an inner surface of an upper shell of a mini-disk cartridge.

Similarly, the arrows in FIG. 7b indicate the general direction of melt flow from hot-runner valve, over mold surface 502 to form the inner surface of upper shell 60. In a manner similar to the lower shell 50, depressions 353, 363, and 373 are first filled. Channels 183 and 453, which form walls 181 and 450, allow depressions 323, 333, 343, 383, 393, 403, and 413 to be quickly filled. Also as indicated by the flow arrows of FIG. 7b, depressions 283, 293, 303, and 313 may be filled via flow from channels 183 and 193 as well as from flow over the center portion of the mold.

Figure 8A:
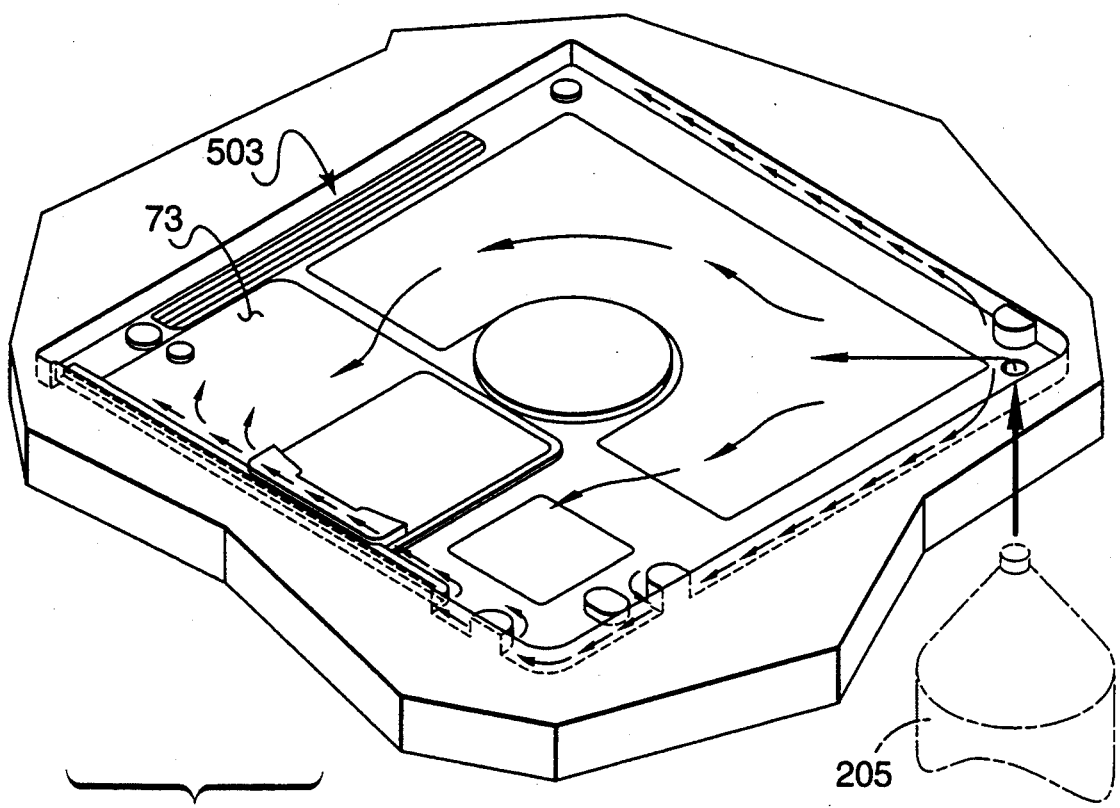
FIG. 8A illustrates a first position of a hot-runner valve gate and a first flow pattern of polymer melt with respect to a surface of the mold which forms an outer surface of a lower shell of a mini-disk cartridge.
Figure 8B:
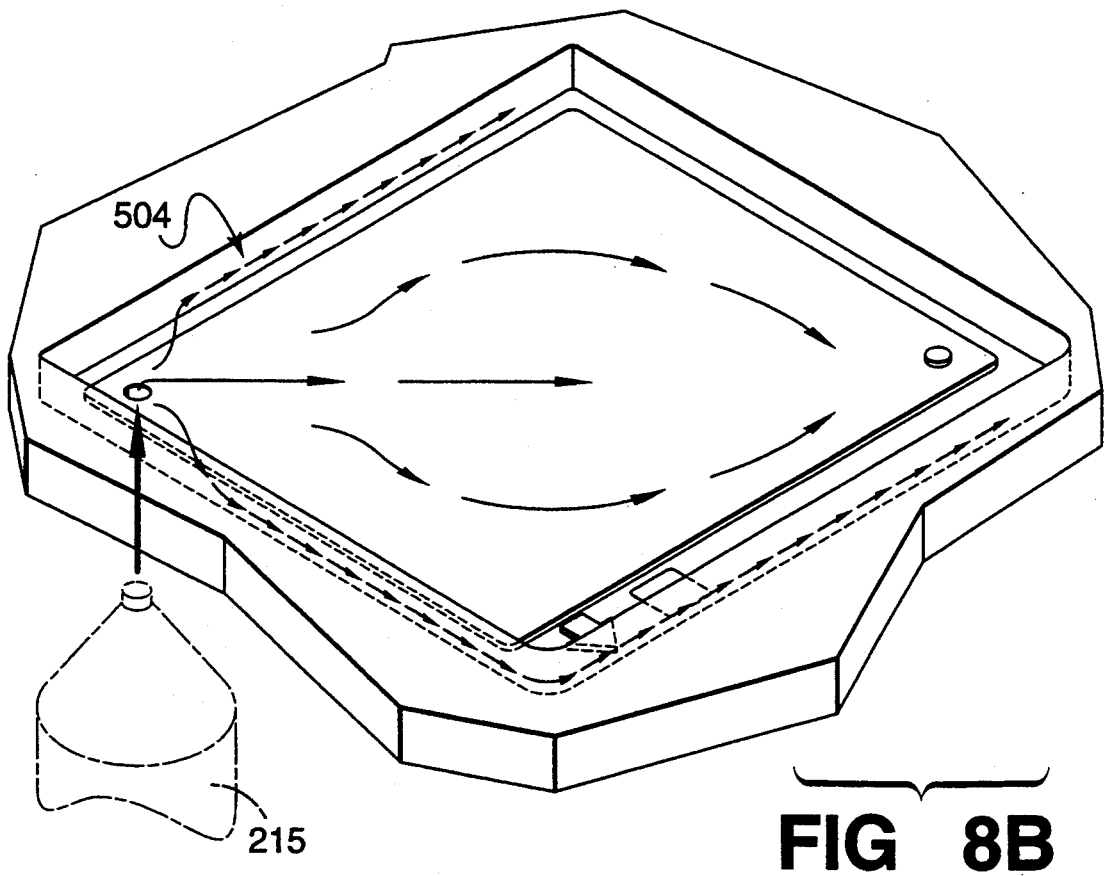
FIG. 8B illustrates a first position of a hot-runner valve gate and a first flow pattern of polymer melt with respect to a surface of the mold which forms an outer surface of an upper shell of a mini-disk cartridge.

FIGS. 8a and 8b illustrate polymer melt flow across surfaces 503 and 504, respectively, of the mold which form the outer surfaces of the lower and upper shells. As indicated by the flow arrows in FIG. 8a, melt flows along the mold edges and across the center portions to fill the area of decreased cross-sectional area indicated by a structure 73 which forms the shutter recess 70. A similar flow pattern is illustrated in FIG. 8b from valve gate 210.

Figure 9A:
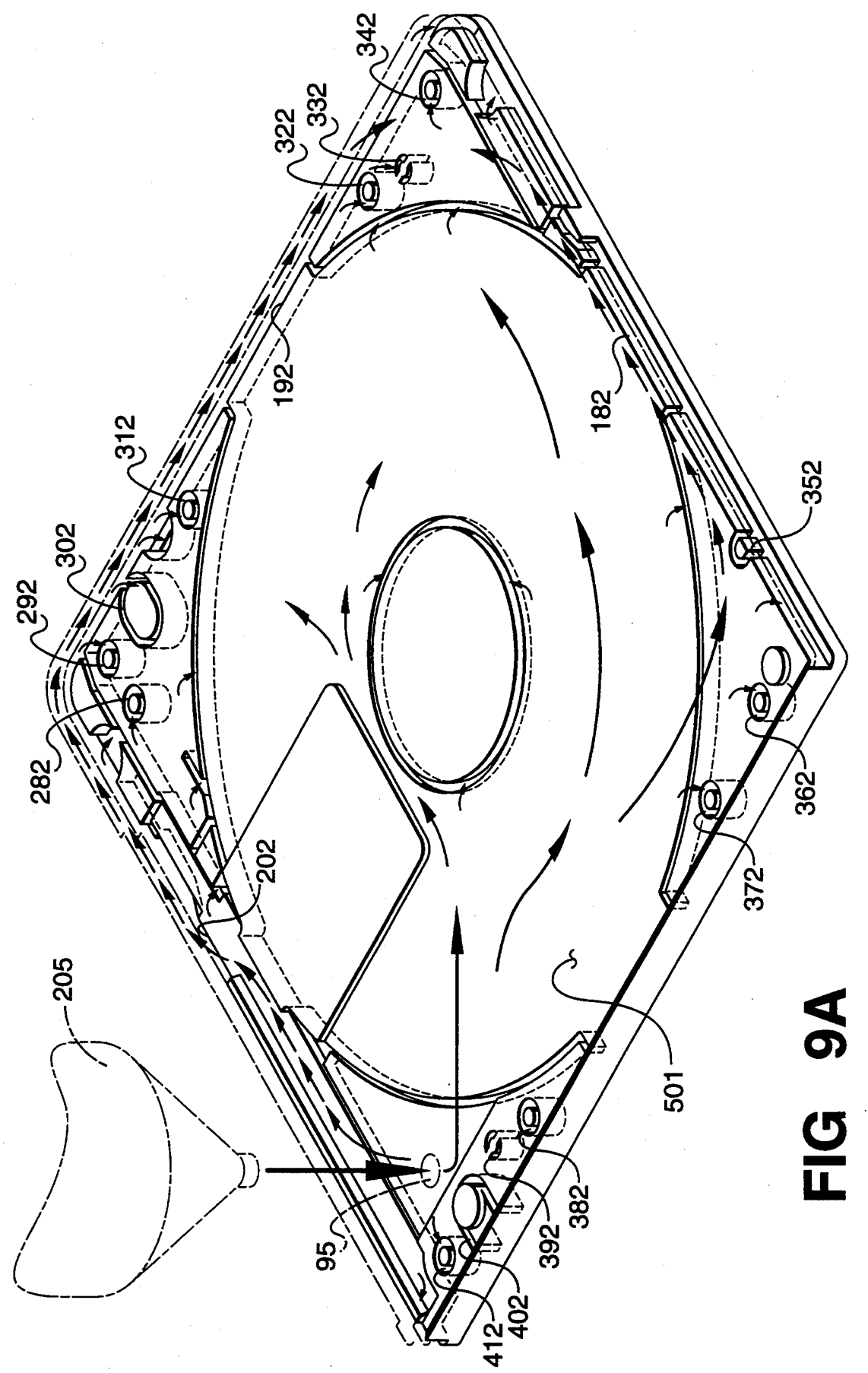
FIG. 9A illustrates a second position of a hot-runner valve gate and a second flow pattern of polymer melt with respect to a surface of the mold which forms an inner surface of a lower shell of a mini-disk cartridge.

FIGS. 9a, 9b, 10a, and 10b illustrate the polymer melt flow pattern in the mold during injection when gate locations 95 and 420 are used. FIG. 9a illustrates a mold surface 501 which forms the inner surface of the lower shell 50. Hot-runner valve 205 allows polymer melt to be injected into the mold. Arrows indicate the general direction of flow throughout the mold to various structures. These structures include depressions and channels which form bosses and sidewalls, respectively for each shell. Depressions 382, 392, 402 and 412 are first exposed to the melt. The melt flows along channel-like structures 202, 192, and 182 so that remote portions which offer a greater resistance to flow may be quickly filled. Thus, melt can fill depressions 282, 292, 302, and 312 as well as depressions 372, 362, and 352. Furthermore, depressions 322, 332, and 342 can also be filled quickly from melt flow over the center portion of the mold as well as along channel 192.

Figure 9B:
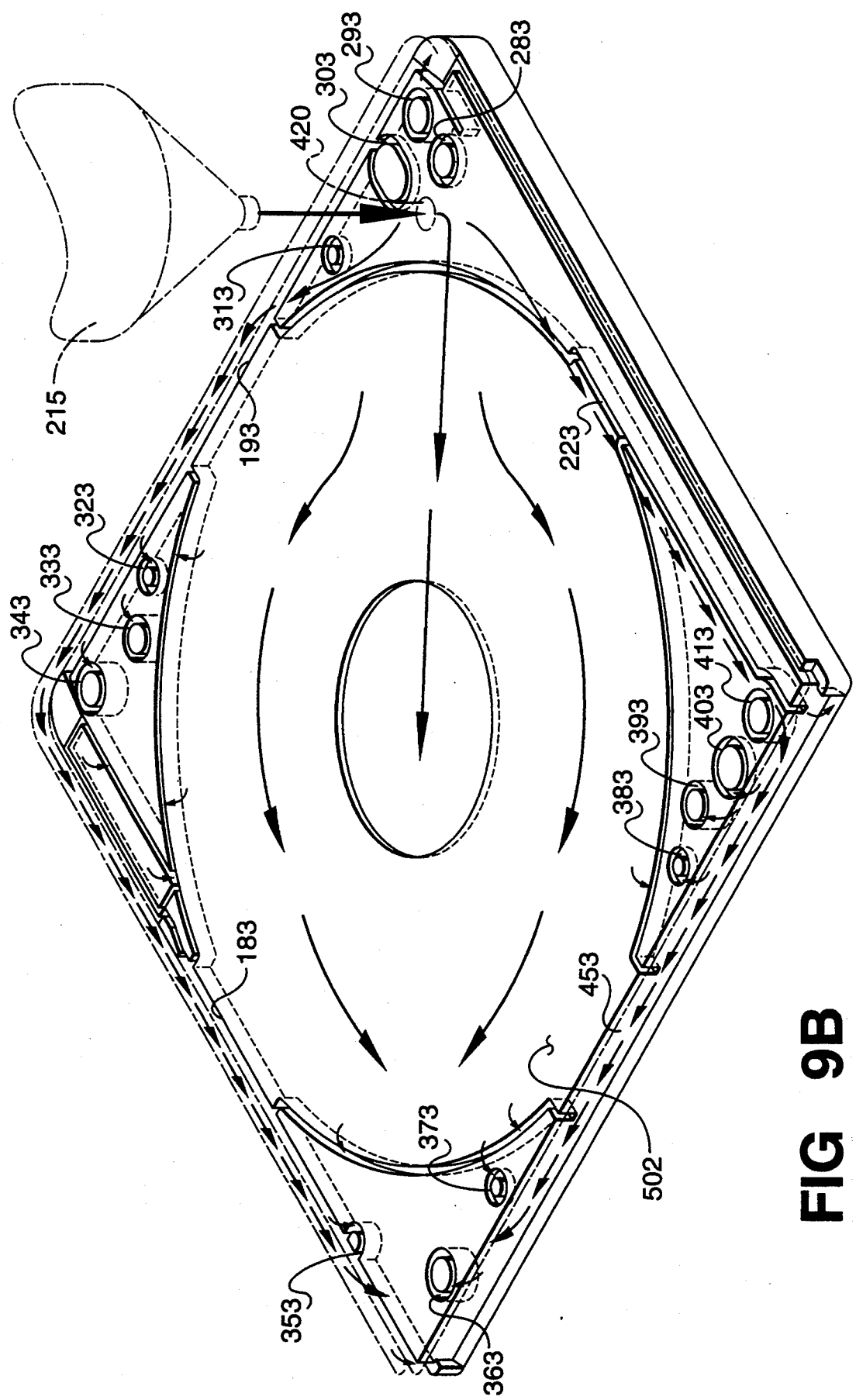
FIG. 9B illustrates second position of a hot-runner valve gate and a second flow pattern of polymer melt with respect to a surface of the mold which forms an inner surface of an upper shell of a mini-disk cartridge.

Similarly, the arrows in FIG. 9b indicate the general direction of melt flow [from] hot-runner valve gate 210, over mold surface 502 to form the inner surface of upper shell 60. In a manner similar to the lower shell 50, depressions 283, 293, 303, 311 are first filled. Channels 223 and 193, which form walls 221 and 191, allow depressions 323, 333, 343, and depressions 383, 393, 403, and 413 to be quickly filled. Also as indicated by the flow arrows of FIG. 9b, depressions 353, 363, and 373 may be filled via flow from channels 223 and 193 as well as from flow over the center portion of the mold.

Figure 10A:
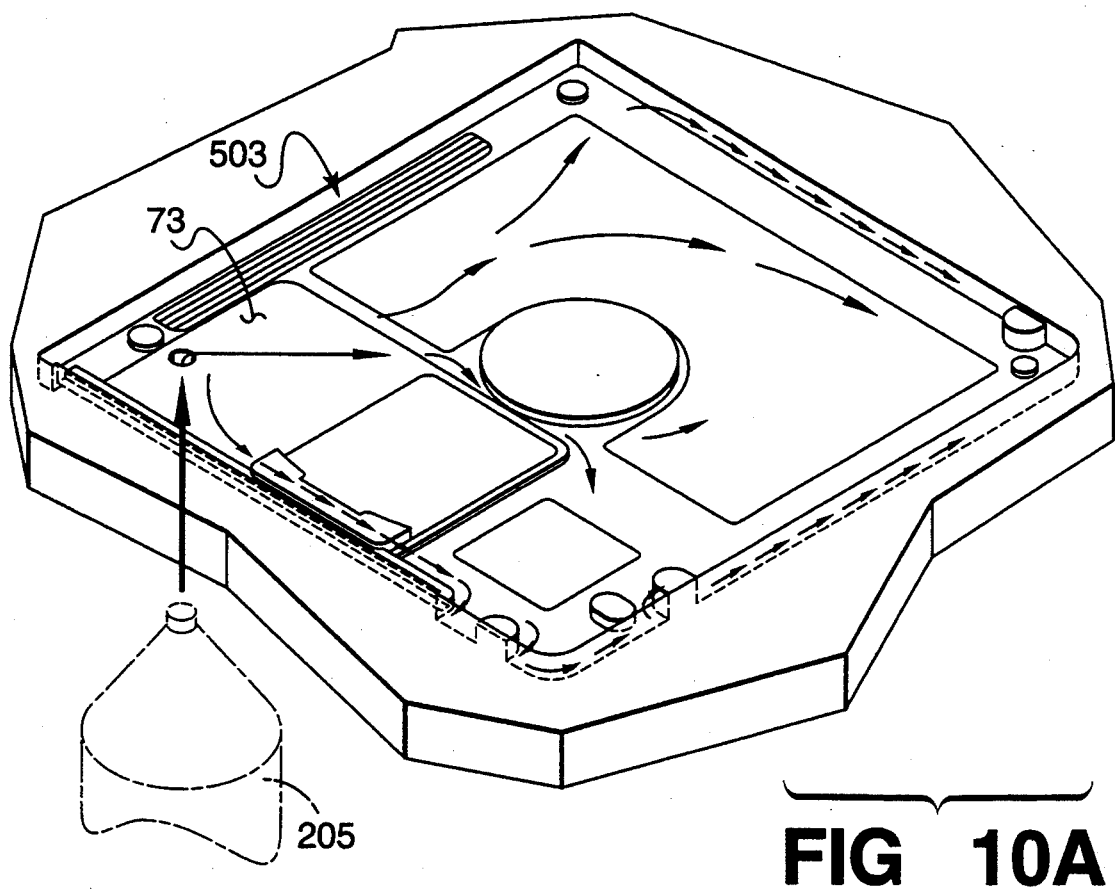
FIG. 10A illustrates a second position of a hot-runner valve gate and a second flow pattern of polymer melt with respect to a surface of the mold which forms an outer surface of a lower shell of a mini-disk cartridge.
Figure 10B:
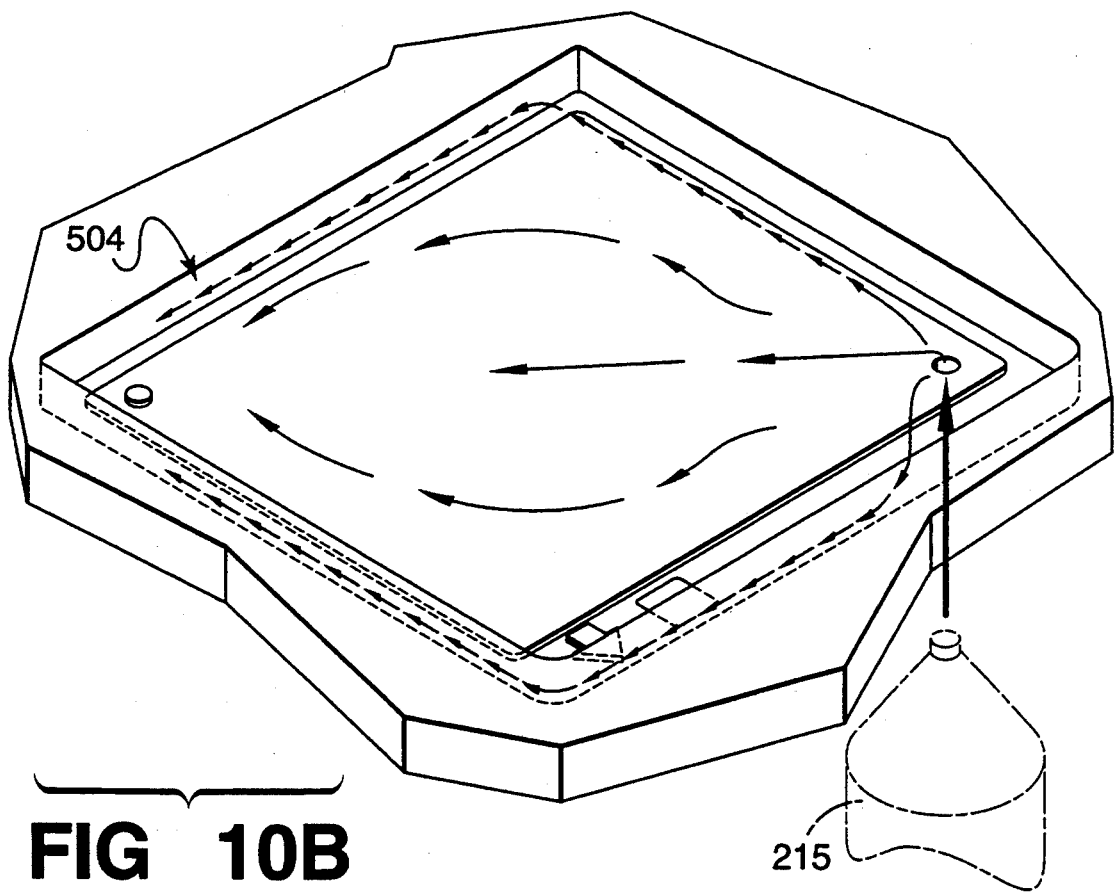
FIG. 10B illustrates a second position of a hot-runner valve gate and a second flow pattern of polymer melt with respect to a surface of the mold adapted to form an outer surface of an upper shell of a mini-disk cartridge.

FIGS. 10a and 10b illustrate polymer melt flow across mold surfaces 503 and 504, respectively, which form the outer surfaces of the lower and upper shells. As indicated by the flow arrows in FIG. 10a, melt flows along the mold edges and across the center portions to fill the area of decreased cross-sectional area indicated by structure 73 which forms the shutter recess. A similar flow pattern is illustrated in FIG. 10b from valve gate 215.

It should be understood that various changes to the present invention may be made by the ordinarily skilled artisan, without departing from the spirit and scope of the present invention which is presented in the claims below. The ordinarily skilled artisan will understand that this disclosure presents an example of the invention and is not meant to limit the invention, as presented in the claims, in any way whatsoever.

What is claimed is:

1. An injection molding apparatus for molding an object comprising:
    a main cavity, the main cavity comprising:
        a first surface adapted to form an inner surface of the object,
        the first surface including a first portion having a first resistance to polymer melt flow, said first portion of said first surface corresponding generally to regions on the inner surface of the object having features extending from the inner surface;
        the first surface further including a second portion having a second resistance to polymer melt flow, said first resistance to polymer melt flow in said first portion being greater than said second resistance to polymer melt flow in said second portion, said second portion of said first surface corresponding generally to relatively flat regions of the inner surface;
    a second surface opposite the first surface adapted to form an outer surface of the object;
    four sidewalls disposed between the first and second surfaces adapted to form edges of the object;
    the apparatus further consisting of one valve gate positioned adjacent the first portion;
    whereby the first portion is filled with polymer melt first and the second portion is filled with polymer melt thereafter.

2. The apparatus of claim 1 wherein the object is a lower shell for a mini-disk cartridge.

3. The apparatus of claim 1 wherein the first portion further includes:
    a plurality of small cavities adapted to form internal connecting bosses on the inner surface of the object, connected to the main cavity, and located in a vicinity of a first corner of the mold.

4. The apparatus of claim 1 wherein the first portion further includes:
    channels originating from a first corner of the mold, disposed parallel to sidewalls of the mold, and forming sidewalls of the molded object; whereby the channels allow polymer melt to flow freely to corners near the first corner, allowing even distribution of polymer melt throughout the mold, and promoting even cooling of polymer melt throughout the mold.

5. The apparatus of claim 4 wherein the valve gate is a hot-runner valve gate.

6. The apparatus of claim 1 wherein the first portion further includes:
    a plurality of small cavities adapted to form internal connecting bosses on the inner surface of the object, connected to the main cavity, and located in a vicinity of a first corner of the mold;
    channels originating from the first corner of the mold, disposed parallel to sidewalls of the mold, and forming sidewalls of the molded object;
    whereby the channels allow polymer melt to flow freely to corners disposed adjacent to the first corner, allowing even distribution of polymer melt throughout the mold, and promoting even cooling of polymer melt throughout the mold.

7. The apparatus of claim 6 wherein the valve gate is a hot-runner valve gate.

8. An injection molding apparatus for molding a lower shell for a mini-disk cartridge comprising:
    a main cavity, the main cavity comprising:
        a first surface adapted to form an inner surface of the lower shell, a second surface opposite the first surface and adapted to form an outer surface of the lower shell, and sidewalls disposed between the first and second surfaces adapted to form edges of the lower shell;
        the first surface including a first portion, said first portion including a plurality of small cavities adapted to form internal connecting bosses on the inner surface of the lower shell, connected to the main cavity, and located in a vicinity of a first corner of the mold, channels originating from the first corner of the mold, disposed parallel to sidewalls of the mold, and forming sidewalls of the molded lower shell, said cavities and channels contributing to defining a first resistance to polymer melt flow, said first portion of said first surface corresponding generally to regions on the inner surface of the lower shell having features extending from the inner surface;
        the first surface further including a second portion having a second resistance to polymer melt flow, said first resistance to polymer melt flow in said first portion being greater than said second resistance to polymer melt flow in said second portion, said second portion of said first surface corresponding generally to relatively flat portions of the inner surface of the lower shell;

the apparatus further consisting of one valve gate positioned adjacent said first portion;

whereby polymer melt fills the plurality of small cavities first, the channels allow polymer melt to flow freely from the first corner to corners near the first corner, thereby allowing even distribution of polymer melt throughout the mold and promoting even cooling of polymer melt throughout the mold.

* * * * *